G. NATHORP.

Car Wheel.

No. 3,919. Reissued April 12, 1870.

Witnesses:
Chas. A. Scott
J. B. Beecher.

Inventor:
Gustavus Nathorp.
By Attorney
F. A. McIntire.

N. PETERS. Photo-Lithographer, Washington, D. C.

United States Patent Office.

GUSTAVUS NATORP, OF NEW YORK, N. Y.

*Letters Patent No.* 83,722, *dated November* 3, 1868; *reissue No.* 3,919, *dated April* 12, 1870.

IMPROVEMENT IN RAILWAY-CAR WHEELS

The Schedule referred to in these Letters Patent and making part of the same.

*To all whom it may concern:*

Be it known that I, GUSTAVUS NATORP, of New York city, of New York county, in the State of New York, have invented certain new and useful "Improvements in Car-Wheels;" and I do hereby declare that the following is a full and exact description thereof, reference being had to the accompanying drawings making part of this application.

My invention relates to certain new and useful improvements in that class of car-wheels which are made of metal and wood combined.

Previous to my invention many methods of construction in this kind of wheels have been suggested; some in which a metallic hub merely is employed, in combination with a wooden body provided with a metallic tire; others, in which the hub and body are made of metal, with merely a thin annular band or packing of wood interposed between the periphery of said metallic body and the metallic tire; and where a wooden portion has been interposed between the hub and rim, the blocks of wood have been made with depressions, into which fitted ribs or projections on the flanches of the hub to retain the blocks.

In all the forms or construction of compound wood and metal wheels, in which a wood packing is interposed between the metallic tire and body, some sort of metallic retaining-ring or other device has been found necessary to insure the retention of the tire and of the wooden blocks in place. Of course all such necessary retaining-rings, or other strengthening devices, have added materially to the cost and complexity of the manufacture of this kind of wheels.

My invention has for its objects to dispense with all retaining-bands, rings, or other appliances, for the retention of the tire and locking together of the metallic and wooden portions, and at the same time, to produce a wheel more simple and economic than, and equally as strong and desirable as, any other compound wheel heretofore made; and, to these ends, My invention consists in forming the periphery of the metallic body of the wheel with annular lips (or a dovetail-shaped groove,) and the blocks of wood with dovetail-shaped projections, and interlocking the said metallic body and wooden blocks together, as will be hereinafter more fully explained; and in connection with a metallic body and wooden blocks so connected, the employment of a metallic tire interlocking with the wooden blocks, and retained without the employment of separate retaining-bands, all as hereinafter set forth.

To enable those skilled in the art to make and use my invention, I will proceed to more fully describe it, referring, by letters, to the accompanying drawings, in which—

Figure 1:
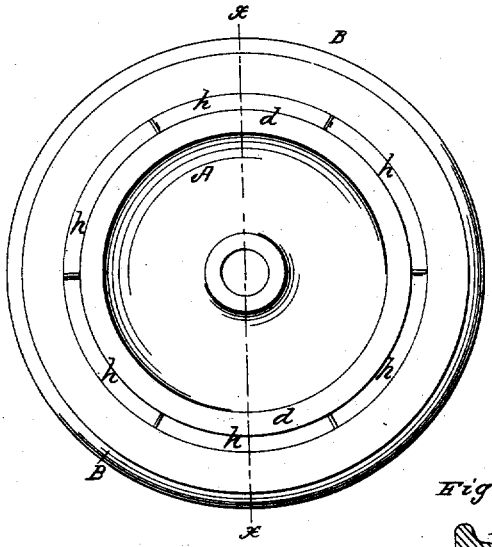
Figure 1 is an elevation of one of my improved compound wheels.
Figure 2:
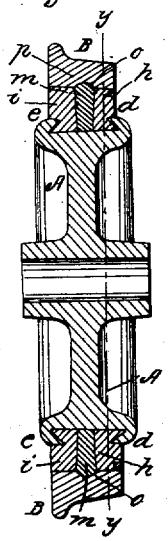
Figure 2 is a section at *x x* of fig. 1.
Figure 5:
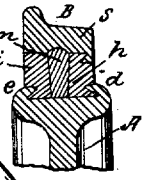
Figure 3:
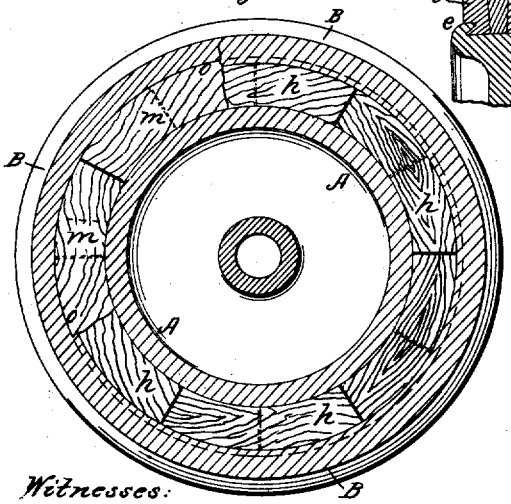
Figure 3 is a section at *y y*, fig. 2.

Figure 5, detail section, showing a modification.

In the several figures—

A represents the metallic body of the wheel, which may be made of the desired size and design, and B, a metallic tire.

Figure 4:
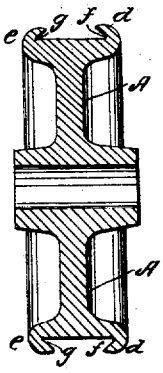
Figure 4 is a section of the body alone.

The periphery of the body A is cast, or otherwise formed, with annular lips *d e*, in such manner as to form dovetailed recesses at *f g*, (see fig. 4,) into which fit the dovetails of the two sets of blocks, *h h*, &c., and *i i*, &c.

*m m*, &c., are center-wedges or keying-blocks, which are forced in between the two sets *h h* and *i i*, as illustrated, after the said sets are placed in position.

The wedge-blocks *m* are so shaped as to protrude or project slightly beyond the faces of the other blocks *h* and *i*, as shown at *o*, and the internal face or periphery of the tire B is formed with a groove or slight annular depression at *p* to accommodate the said protruding wedge-ends.

The object of this peculiarity of construction is to permit the forcing or shrinking on of the tire over the projections *o*, so that, by the introduction of said projections within the annular depression *p*, the retention of the tire may be insured.

The blocks *i* are made a little longer than those marked *h*, and the two sets are made tapering, so that the periphery of the structure, (before the tire is put on,) with the exceptions of the projections *o*, presents a beveled surface to match with the internal beveled surface of the tire B, as shown.

To put the parts together, after they have been made of the shapes shown, I take either set of blocks, *h* or *i*, and place it in position. I then put in the other set, putting the blocks of the two sets about opposite to each other. I then insert the wedge-shaped blocks *m* radially, arranging them so as to break joints with the blocks *h* and *i*, and force them home, causing the blocks *h* and *i* to be each and all securely held in their seats. I then force or shrink (or both) on the tire B, so that the projection *o* (when the whole is finished) will be expanded and seated in the annular depression or groove at *p*.

It will be seen that when thus completed and put together, the several parts will be securely locked together, and that, as an entirety, the wheel will be perfectly strong and reliable, and that by this method of construction, I am enabled to produce a strong, economic, and cheap compound wheel, without the use, expense, and incumbrance of any auxiliary retaining-ring or rings, or other locking or strengthening devices.

By forming the body A with the dovetailed recesses *f* and *g*, and the wooden blocks correspondingly, to fit into said recesses, the blocks of wood and the metallic body may be securely interlocked and fastened together, as shown and described.

Of course the design and proportions of the several parts may be varied from what I have shown and will be regulated at the discretion of the manufacturer, or engineer, and as practice or experience may dictate, and the shape of the parts may also be changed without departing from the spirit of my invention.

It will be understood that one part of my invention may be used with advantage without the employment of the other part. In lieu of using the mode shown of connecting with the wooden packing (or retaining in place) the tire, other methods may be adopted and used in connection with my method of securing the blocks and body together, which I consider of great importance and value.

Having fully explained my invention, so that those skilled can make and use it,

What I claim as new, and desire to secure by Letters Patent, is—

Connecting the blocks of wood, which are interposed between the body of the wheel and the rim or tire, by fitting the blocks to a dovetail groove in the outer periphery of the body of the wheel, substantially as described.

Also, in combination with the body and wooden blocks so connected, the employment of a metallic rim interlocked with or retained on the wooden packing without any separate retaining-bands, substantially as set forth.

In testimony whereof I have hereunto set my hand and seal this 14th day of February, 1870.

G. NATORP. [L. S.]

Witnesses:

FRANK H. TAYLOR,
P. H. CAMPBELL.